J. M. ROE.
NUT LOCK.
APPLICATION FILED SEPT. 4, 1912.
1,055,228.
Patented Mar. 4, 1913.
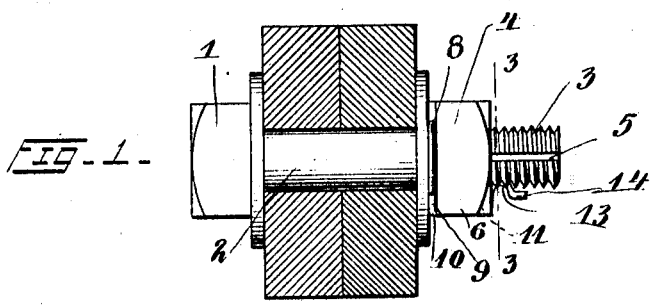
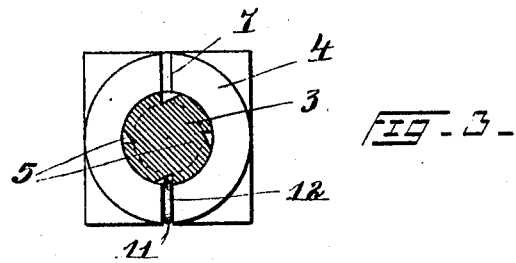
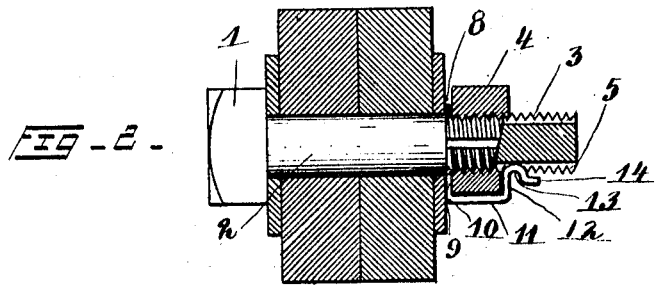
Inventor
Jackson M. Roe
By Victor J. Evans
Attorney
Witnesses

UNITED STATES PATENT OFFICE.

JACKSON M. ROE, OF SUNNYSIDE, WASHINGTON, ASSIGNOR OF ONE-HALF TO JOHN ALEXANDER, OF SUNNYSIDE, WASHINGTON.

NUT-LOCK.

1,055,228.  Specification of Letters Patent.  Patented Mar. 4, 1913.

Application filed September 4, 1912. Serial No. 718,522.

*To all whom it may concern:*

Be it known that I, JACKSON M. ROE, a citizen of the United States, residing at Sunnyside, in the county of Yakima and State of Washington, have invented new and useful Improvements in Nut-Locks, of which the following is a specification.

This invention relates to nut locks and the object of the invention is to provide a cheaply constructed device which may be readily applied in places where the ordinary bolts are used, to prevent the nuts from coming loose.

A further object of the invention is the provision of a device of this character which permits the tightening of the nut at all times without touching the locking device and which permits the removal of the nut when necessary without destroying the nut lock.

Further objects of the invention will appear as the following specific description is read in connection with the accompanying drawing which forms a part of this application, and in which:—

Figure 1 is a side elevation. Fig. 2 is a vertical sectional view. Fig. 3 is a horizontal sectional view on the line 3—3 of Fig. 1.

Referring more particularly to the drawing 1 represents a bolt having the usual bit 2 and threaded portion 3, and 4 represents an ordinary nut. The threaded portion of the bolt is provided with a series of longitudinal grooves one wall of which is tangential to the bolt so as to provide a cam surface as shown.

The walls are indicated at 5 and are adapted to receive a locking device to be hereinafter described. The nut is provided with a vertical slot 6 upon one side and with a horizontal slot 7 on its top. These slots are formed to receive the locking device which consists of a single piece of spring wire coiled at one end as shown at 8 to receive the bolt and having a radial extension 9 which is turned at right angles as at 10 to lie in the vertical slot 6. The upper end of the vertical portion 10 is bent back so as to lie parallel with the portion 9 and to engage in the horizontal slot 7. This inwardly bent portion which is indicated at 11 and a right angular portion 12 form a locking tongue 13 which is adapted to engage the grooves 5 of the bolt, the right angular portion being provided with an operating extension 14 by which the tongue may be disengaged from the grooves when it is desired to remove the nut from the bolt. It will be noticed that as the locking tongue is arranged within the slots of the nut and also in the grooves of the bolt that the nut is prevented from turning except in a direction to tighten the same upon the bolt.

What is claimed is:—

The combination with a bolt having a threaded portion with longitudinal cam faced grooves arranged therein, a slotted nut threaded on the bolt, a spring washer surrounding the bolt and an angular extension on the spring washer which lies in the slot of the nut and engages the grooves in the bolt.

In testimony whereof I affix my signature in presence of two witnesses.

JACKSON M. ROE.

Witnesses:
W. A. FUNK,
CHARLES E. VETTER.